US010833341B2

(12) United States Patent
Pham et al.

(10) Patent No.: US 10,833,341 B2
(45) Date of Patent: Nov. 10, 2020

(54) NON-CATALYTIC HYDROGEN GENERATION PROCESS FOR DELIVERY TO A HYDRODESULFURIZATION UNIT AND A SOLID OXIDE FUEL CELL SYSTEM COMBINATION FOR AUXILIARY POWER UNIT APPLICATION

(71) Applicant: Saudi Arabian Oil Company, Dhahran (SA)

(72) Inventors: Thang Viet Pham, Dhahran (SA); Hasan Imran, Dhahran (SA); Mohamed Daoudi, The Hauge (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 299 days.

(21) Appl. No.: 16/039,040

(22) Filed: Jul. 18, 2018

(65) Prior Publication Data

US 2018/0323458 A1    Nov. 8, 2018

Related U.S. Application Data

(62) Division of application No. 13/650,674, filed on Oct. 12, 2012, now Pat. No. 10,056,631.
(Continued)

(51) Int. Cl.
*H01M 8/0612* (2016.01)
*H01M 8/0662* (2016.01)
(Continued)

(52) U.S. Cl.
CPC ........ *H01M 8/0631* (2013.01); *C10G 25/003* (2013.01); *C10G 35/02* (2013.01);
(Continued)

(58) Field of Classification Search
CPC .... H01M 8/22; H01M 8/0612; H01M 8/0631; H01M 8/0675
See application file for complete search history.

(56) References Cited

U.S. PATENT DOCUMENTS 3,198,664 A    8/1965   Kunz
4,670,359 A    6/1987   Beshty et al.
(Continued)

FOREIGN PATENT DOCUMENTS

EP       1497878 A1       1/2005
JP    2003277015 A      10/2003
(Continued)

OTHER PUBLICATIONS

Ahmed et al., "Hydrogen from hydrocarbon fuels for fuel cells", International Journal of Hydrogen Energy, Dec. 31, 2001, pp. 291-301, vol. 26, Elsevier, XP-002708043.
(Continued)

*Primary Examiner* — Sarah A. Slifka
*Assistant Examiner* — Brent C Thomas
(74) *Attorney, Agent, or Firm* — Bracewell LLP; Constance G. Rhebergen; Kevin R. Tamm

(57) ABSTRACT

A non-catalytic hydrogen generation process is provided that supplies hydrogen to a hydrodesulfurization unit and a solid oxide fuel cell system combination, suitable for auxiliary power unit application. The non-catalytic nature of the process enables use of sulfur containing feedstock for generating hydrogen which is needed to process the sulfur containing feed to specifications suitable for the solid oxide fuel cell. Also, the non-catalytic nature of the process with fast dynamic characteristics is specifically applicable for startup and shutdown purposes that are typically needed for mobile applications.

18 Claims, 1 Drawing Sheet

Related U.S. Application Data

(60) Provisional application No. 61/547,562, filed on Oct. 14, 2011.

(51) Int. Cl.
   *H01M 8/22*    (2006.01)
   *C10G 63/00*   (2006.01)
   *C10G 45/02*   (2006.01)
   *C10G 35/02*   (2006.01)
   *C10G 25/00*   (2006.01)

(52) U.S. Cl.
   CPC ............. *C10G 45/02* (2013.01); *C10G 63/00* (2013.01); *H01M 8/0612* (2013.01); *H01M 8/0675* (2013.01); *H01M 8/22* (2013.01); *C10G 2300/42* (2013.01); *Y02P 30/20* (2015.11)

(56) References Cited

U.S. PATENT DOCUMENTS

| | | | |
|---|---|---|---|
| 5,686,196 | A | 11/1997 | Singh et al. |
| 5,928,805 | A | 7/1999 | Singh et al. |
| 7,497,882 | B2 | 3/2009 | Khaliq |
| 7,648,541 | B2 | 1/2010 | Bolden |
| 2004/0091753 | A1 | 5/2004 | Terorde et al. |
| 2004/0150366 | A1 | 5/2004 | Ferral et al. |
| 2004/0159585 | A1 | 8/2004 | Liu et al. |
| 2004/0253493 | A1 | 12/2004 | Kamijo |
| 2005/0089731 | A1 | 4/2005 | Ogiwara et al. |
| 2005/0181247 | A1 | 8/2005 | Foger et al. |
| 2006/0140852 | A1 | 6/2006 | Russell et al. |
| 2006/0166054 | A1 | 7/2006 | Ahmed |
| 2007/0092766 | A1 | 4/2007 | England et al. |
| 2008/0107932 | A1 | 5/2008 | Pram |
| 2008/0267848 | A1* | 10/2008 | Stephanopoulos ...... C10K 1/28 423/244.05 |
| 2009/0220390 | A1 | 9/2009 | Grouset et al. |
| 2009/0263316 | A1 | 10/2009 | Iyer et al. |
| 2010/0028730 | A1 | 2/2010 | Ghezel-Ayagh et al. |
| 2010/0279194 | A1 | 11/2010 | Elangovan et al. |

FOREIGN PATENT DOCUMENTS

| | | |
|---|---|---|
| WO | 03063282 A1 | 7/2003 |
| WO | 2006089415 A1 | 8/2006 |
| WO | 2006103369 A2 | 10/2006 |

OTHER PUBLICATIONS

International Report on Patentability for PCT Patent Application No. PCT/US2012/059935; dated Apr. 15, 2004.

Linde AG, "Synthesis Gas," XP-002708041, Dec. 31, 2003, pp. 1-2, http://www.linde-engineering.com/en/process_plants/hydrogen_and_synthesis_gas_plants/gas_products/synthesis_gas/index.html.

Logdberg et al., "Natural gas conversion: The Reforming and Fischer-Tropsch process" Dec. 31, 2003, pp. 1-91, XP002708042.

PCT International Search Report and the Written Opinion of the International Searching Authority dated Aug. 12, 2013; International Application No. PCT/US2012/059935; International Filing Date: Oct. 12, 2012.

Physical and chemical properties, National Academy of Sciences, 1996, JP-8: https://www.ncbi.nlm.nih.gov/books/NBK231234/.

* cited by examiner

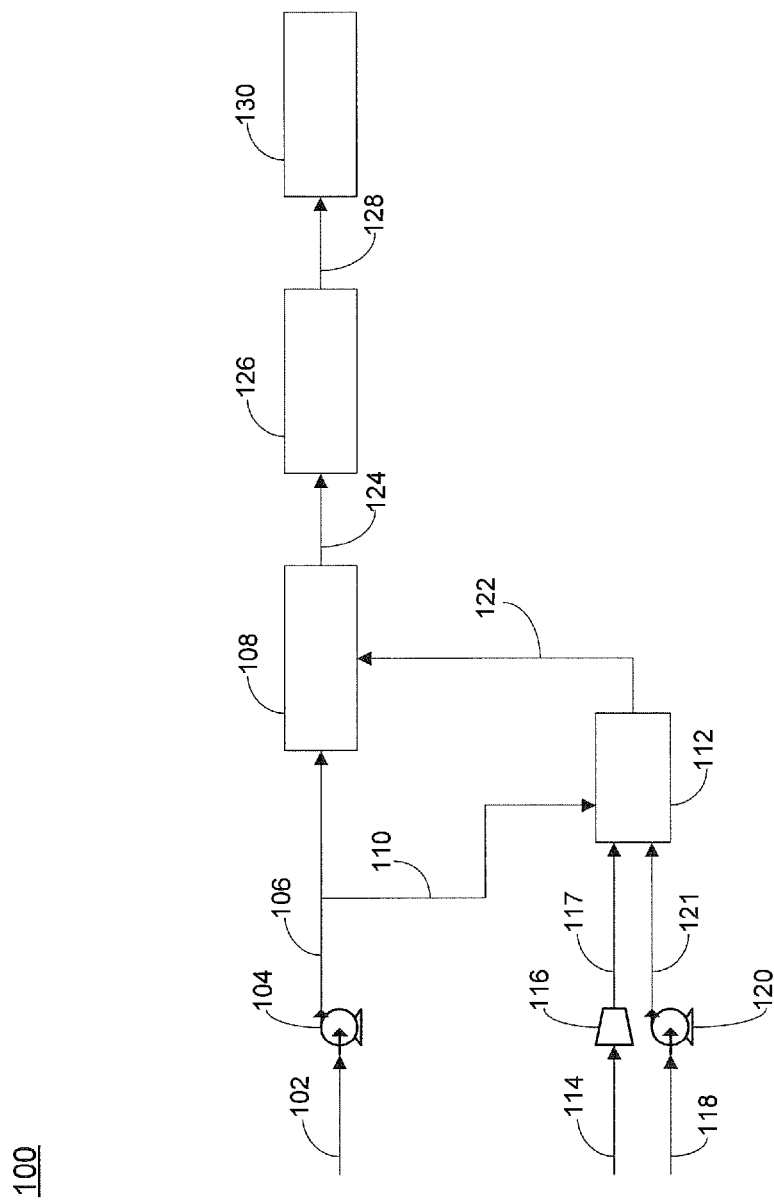

NON-CATALYTIC HYDROGEN GENERATION PROCESS FOR DELIVERY TO A HYDRODESULFURIZATION UNIT AND A SOLID OXIDE FUEL CELL SYSTEM COMBINATION FOR AUXILIARY POWER UNIT APPLICATION

RELATED APPLICATIONS

This application is a non-provisional application and claims priority to and the benefit of U.S. application Ser. No. 13/650,674, filed Oct. 12, 2012, which itself claims priority to U.S. Provisional Patent Application Ser. No. 61/547,562, filed on Oct. 14, 2011, the disclosures of which are incorporated here by reference in their entirety.

FIELD OF THE INVENTION

This invention relates to a solid oxide fuel cell (SOFC) system for supplying auxiliary power, wherein the SOFC includes an integrated desulfurization unit. More specifically, the invention relates to a hydrogen generation process for supplying hydrogen to a desulfurization unit, for supplying a desulfurized feed stream to a solid oxide fuel cell.

BACKGROUND OF THE INVENTION

Increasingly stringent environmental regulations have been one driving force in the development of Solid Oxide Fuel Cell technology. Widespread attention has been received for various potential commercial applications, due in part to the ability to produce electrical power from relatively small reactors that can be supplied with a liquid hydrocarbon feed. The high fuel-to-electricity conversion efficiency of solid oxide fuel cells leads to lower carbon dioxide emissions per kWh output of useful energy, while the emissions of various harmful chemicals, such as $NO_x$, $SO_x$, and unreacted hydrocarbons, are virtually zero. Applications targeted for solid oxide fuel cells include distributed and centralized power generation, vehicle propulsion, remote area power generation, marine, military and aerospace applications.

One problem, however, that is experienced with solid oxide fuel cell technology comes from the various sulfur compounds that may be present in the hydrocarbon feed that is supplied to the cell. The anodes of the solid oxide fuel cell are typically nickel based and can be readily poisoned by sulfur compounds that are commonly found in hydrocarbon fuels. As a result, desulfurization of the hydrocarbon feed is a necessary step for all solid oxide fuel cell systems that utilize nickel pre-reforming, anodes and a hydrocarbon feed. Commercially available hydrocarbon desulfurization processes require hydrogen gas, either generated or stored on site, for use in a hydrodesulfurization unit, where a portion of high molecular weight sulfur compounds present in the liquid hydrocarbon can be converted to hydrogen sulfide. The hydrogen sulfide can subsequently be removed by a bed of zinc oxide adsorbents.

The hydrodesulfurization systems typically consume large quantities of hydrogen, depending on the quality and the sulphur content of the fuel supplied to the desulfurization unit. For potential on-board vehicle applications, hydrogen storage becomes a major technical and economic challenge due to the space limitations of the vehicle. Thus, the need exists for the development of means for localized on-demand hydrogen generation using the available fuel from within the vehicle architecture.

SUMMARY

Generally, an apparatus and method for the generation of electricity from a sulfur containing hydrocarbon fuel are provided.

In one aspect, an apparatus for removing sulfur from a sulfur containing hydrocarbon fuel stream is provided. The apparatus includes a non-catalytic reformer that is configured to produce a hydrogen containing product gas stream from the sulfur containing hydrocarbon fuel stream. The apparatus also includes a feed line that is configured to deliver a sulfur containing hydrocarbon fuel stream to a hydrodesulfurization unit, wherein the feed line further includes means for directing a portion of the sulfur containing hydrocarbon fuel stream to the non-catalytic reformer. The apparatus includes a reformer outlet line that delivers the hydrogen containing product gas stream from the reformer to the hydrodesulfurization unit. The hydrodesulfurization unit includes a hydrodesulfurization catalyst and is configured to convert sulfur compounds in the sulfur containing hydrocarbon fuel stream to hydrogen sulfide to produce a treated hydrocarbon fuel stream containing hydrogen sulfide. The apparatus includes a hydrodesulfurization unit outlet line that delivers the treated hydrocarbon fuel stream containing hydrogen sulfide from the hydro-desulfurization unit to an adsorber. The adsorber includes an adsorbent bed that includes an adsorbent that is operable to remove hydrogen sulfide from the treated hydrocarbon fuel stream containing hydrogen sulfide to produce a desulfurized hydrocarbon fuel stream.

In certain embodiments, the apparatus further includes an adsorbent outlet line that delivers the desulfurized hydrocarbon fuel stream to a solid oxide fuel cell, which then converts the desulfurized hydrocarbon fuel stream into electricity. In certain embodiments, the apparatus includes means for controlling the amount of sulfur containing hydrocarbon fuel stream supplied to the reformer in response to the amount of hydrogen required by the hydro-desulfurization unit. In certain embodiments, the apparatus produces a desulfurized hydrocarbon fuel stream containing less than about 1 ppm of total sulfur.

In another aspect, a method for producing electricity from a sulfur containing hydrocarbon fuel stream is provided. The method includes the steps of supplying at least a portion of the sulfur containing hydrocarbon fuel stream to a non-catalytic reformer to generate a hydrogen containing product stream; supplying the hydrogen containing product stream from the reformer and at least a portion of the hydrocarbon fuel stream to a hydrodesulfurization unit; desulfurizing the sulfur containing hydrocarbon fuel stream in the hydrodesulfurization unit to produce a hydrogen sulfide containing hydrocarbon fuel stream; supplying the hydrogen sulfide containing hydrocarbon fuel stream from the hydrodesulfurization to an adsorber, wherein the adsorber is operable to remove hydrogen sulfide from the hydrocarbon fuel stream to produce a desulfurized hydrocarbon fuel stream; and supplying the desulfurized hydrocarbon fuel stream to a solid oxide fuel cell, wherein said solid oxide fuel cell is configured to produce electricity from said desulfurized hydrocarbon fuel stream.

In certain embodiments, the method includes the step of supplying water and oxygen to the non-catalytic reformer, wherein the reaction of the sulfur containing hydrocarbon fuel stream, water and oxygen are operable to produce a product stream comprising hydrogen. In certain embodiments, the non-catalytic reformer produces a product stream comprising between about 50% and 53.6% hydrogen gas (dry, nitrogen-free basis using commercial diesel as a feedstock). In certain embodiments, the adsorber comprising an adsorbent bed comprising zinc oxide. In certain embodiments, the desulfurized hydrocarbon fuel stream comprising less than about 1 ppm sulfur. In certain embodiments, during continuous operation, between about 5% and 22.5% by volume of the sulfur containing hydrocarbon fuel stream is supplied to the non-catalytic reformer. In certain embodiments, upon start up, all of the hydrocarbon fuel is supplied to the non-catalytic reformer for the production of the hydrogen containing product stream. In certain embodiments, during continuous operation, between about 10.4% and 14.8% by volume of the sulfur containing hydrocarbon fuel stream is supplied to the non-catalytic reformer.

BRIEF DESCRIPTION OF THE DRAWINGS

FIG. 1 is a schematic of one embodiment of the invention.

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figure(s) are set forth without any loss of generality, and without imposing limitations, relating to the claimed invention.

In another embodiment, a process for the conversion of a hydrocarbon feedstock, for example a liquid petroleum based hydrocarbon feedstock that includes sulfur, into electrical power is provided. The method includes the step of supplying the sulfur containing hydrocarbon feedstock to a hydrodesulfurization unit for the conversion of high molecular weight sulfur containing compounds to hydrogen sulfide, removing hydrogen sulfide present in the hydrocarbon feedstock by adsorption to produce a substantially sulfur-free hydrocarbon feed, and supplying the substantially sulfur-free hydrocarbon feed to a solid oxide fuel cell, wherein the substantially sulfur-free hydrocarbon feed is converted to electricity. The method includes the step of providing at least a portion of the sulfur containing hydrocarbon feedstock to an integrated reformer, wherein the sulfur containing hydrocarbon feed can be converted to a hydrogen containing gas mixture that can then be supplied for use in the hydrodesulfurization unit. The additional step of supplying at least a portion of the sulfur containing hydrocarbon feed to an integrated reformer eliminates the need for storing hydrogen gas on site for supplying hydrogen gas to the hydrodesulfurization unit.

In one embodiment, an apparatus is provided for the conversion of a hydrocarbon feedstock to electricity. The apparatus generally includes a hydrodesulfurization unit, a non-catalytic reformer, an adsorber, and a solid oxide fuel cell.

Exemplary hydrocarbon feedstock to the apparatus, including both the reformer and hydrodesulfurization unit, can include natural gas, liquefied petroleum gas (LPG), naphtha, kerosene, jet fuel, diesel, fuel oil and the like, and as noted above, can include sulphur and sulphur containing compounds. In certain embodiments, the hydrocarbon feedstock includes liquid hydrocarbons having a final boiling point of between about 30° C. and about 360° C. In certain embodiments, the hydrocarbon feedstock consists of hydrocarbons having between about 1 and 25 carbon atoms, alternatively between about 1 and 8 carbon atoms, alternatively between about 6 and 12 carbon atoms, alternatively between about 6 and 16 carbon atoms, alternatively between about 8 and 15 carbon atoms, alternatively between about 15 and 25 carbon atoms. In certain embodiments, the hydrocarbon feedstock has a boiling point of up to about 360° C.

Referring now to FIG. 1, one embodiment of an apparatus for the generation of electricity is provided. Apparatus 100 includes feed inlet line 102 for supplying a hydrocarbon feed, wherein said feed can include sulfur. In certain embodiments, the hydrocarbon feed can be a petroleum based hydrocarbon. In certain embodiments, the hydrocarbon feed can be a liquid hydrocarbon. Feed inlet line 102 can optionally include means for supplying the liquid hydrocarbon feed, such as pump 104. Hydrocarbon feed supplied from pump 104 can be supplied via line 106 to hydrodesulfurization unit 108. Line 106 can include means for providing all or a portion of hydrocarbon feed to integrated reformer 112 via line 110, such as a valve. In certain embodiments, the valve can be a control valve that is able to provide an adjustable flow rate of the hydrocarbon feed in line 110. Hydrodesulfurization unit 108 can include one or more known desulfurization catalysts for conversion of high molecular weight hydrocarbons into hydrogen sulfide. Exemplary hydrodesulfurization catalysts can include one or more active metal ingredient, for example, molybdenum or cobalt, as known in the art. In certain embodiments, commercially available desulfurization technology for hydrocarbon feedstocks can be a two-step process. The first step, hydro-desulfurization (HDS), utilizes catalysts having active ingredients, such as nickel-molybdenum or cobalt-molybdenum, that convert a substantial amount of the high molecular weight sulfur compounds contained in the liquid petroleum feedstocks, for example benzothiophenes and dibenzothiophenes, to hydrogen sulfide. The HDS process requires hydrogen for the conversion of high molecular weight sulfur compounds into hydrogen sulfide. The second step, after the HDS step, an adsorbent bed, comprising for example a zinc oxide (ZnO) adsorbent, is utilized to chemically adsorb hydrogen sulfide. Typical operating temperature of the HDS and the adsorber can range between about 300 and 400° C. Whereas typically operating pressures for industrial processes range from about 30 to 130 bars, operating pressures for the on-board vehicle applications described herein will probably be limited to between about 2 and 3 bars. At lower operating pressures, an increased hydrogen content to the HDS will provide a richer hydrogen environment to increase conversion of high molecular weight sulfur compounds to hydrogen sulfide. Similarly, for a heavy liquid hydrocarbon feedstock, an increased hydrogen content to the HDS is required, for example at least about 100 L of hydrogen gas per liter of liquid hydrocarbon, alternatively at least about 200 L of hydrogen gas per liter of liquid hydrocarbon, alternatively at least about 300 L of hydrogen gas per liter of liquid hydrocarbon. Under optimal conditions, the resulting desulfurized hydrocarbon fuels contain less than 0.5 parts per million (ppm) of total sulfur which is typically the upper sulfur tolerant limit of the pre-reformer and the Solid Oxide Fuel Cell.

Integrated reformer 112 can be any reformer capable of converting the hydrocarbon feed to a product gas mixture that includes hydrogen. Exemplary reformers can include steam reformers, autothermal reformers (ATR), and catalytic partial oxidation reformers. In certain embodiments, the reformer is a non-catalytic reformer. Non-catalytic reformers use thermal energy to break the hydrocarbon bonds. One advantage of non-catalytic reformers is that the reformer can accept a similar fuel for the hydrodesulfurization unit 108 that contains the same fraction of the sulphur for generation of the hydrogen-rich gas necessary for the hydrodesulfurization unit 108. All sulphur compounds in the remaining sulphur containing fuel fraction can be removed by the combination of hydrodesulfurization unit 108 and adsorber 126. One exemplary reformer for use herein is described in PCT application WO/2006/103369 and U.S. Pub. Pat. App. No. 2009/0220390, the disclosures of which are incorporated by reference herein in their entirety. In one embodiment, the integrated reformer can include a reaction chamber and a combustion chamber, wherein the reaction and combustion chambers can be mechanically integrated with heat exchangers. Air can be supplied to reformer 112 via line 114 to optional compressor 116, which then supplies the air via line 117 to the reformer. In certain embodiments, reformer 112 can be supplied with pure oxygen. Water can be supplied to reformer 112 via line 118 to optional pump 120, which then supplies the water to the reformer via line 121. Exemplary means for supplying water can include water pumps, hoses, and the like, and exemplary means for supplying air can include an air compressor, an air separation unit, or the like. Reformer 112 converts the hydrocarbon feed, water and air that are supplied thereto into a product gas mixture that can include $CH_4$, $H_2$, $H_2O$, $CO$, $CO_2$, and $N_2$. Reformer 112 is positioned upstream of hydrodesulfurization unit 108. The hydrogen content of the product gas mixture is between about 45% and 55% by volume, alternatively between about 50% and 53.6% by volume on a dry, nitrogen free basis, if commercial diesel were used as feedstock.

One advantage to the use of a non-catalytic reformer is that the hydrocarbon feed can be supplied directly to the reformer. No pre-treatment of the hydrocarbon feed to remove sulfur containing compounds, including hydrogen sulfide, is necessary. This greatly increases the types of fuels that can be supplied to the reformer and solid oxide fuel cell, while also simplifying the design of apparatus 100.

The hydrogen containing product gas mixture produced by reformer 112 can be supplied via hydrogen gas supply line 122 to hydrodesulfurization unit 108. Hydrodesulfurization unit can be configured to convert high molecular weight sulfur containing compounds present in hydrocarbon feed to hydrogen sulfide, thereby producing a treated hydrocarbon feed that includes hydrogen sulfide. Exemplary high molecular weight sulfur containing compounds present in the hydrocarbon feed can include, but are not limited to, dimethyl sulfide, dimethyldisulfide, diethyl sulfide, diethyldisulfide, thiophenes, 2-methylthiophenes, 3-methylthiophenes, dimethylthiophenes, benzothiophenes, and dibenzothiophenes. In certain embodiments, the content of high molecular weight sulfur containing compounds present in the treated hydrocarbon feed is less than about 2 ppm, alternatively less than about 1 ppm. In certain embodiments, between about 1 kg and 15 kg of hydrogen gas is supplied to hydrodesulfurization unit 108 per ton of hydrocarbon fuel being treated. In certain embodiments, the amount of hydrogen gas supplied to the HDS unit is dependent upon the hydrocarbon feed, the amount of high molecular weight sulfur containing compounds present, and the types of high molecular weight sulfur containing compounds present. Generally, lower amounts of hydrogen gas are required for lower molecular weight hydrocarbons, such as methane and ethane, and for lower molecular weight sulfur containing compounds, such as carbon disulfide.

The treated hydrocarbon feed that includes hydrogen sulfide can be supplied from hydrodesulfurization unit 108 via line 124 to adsorber 126, which can include an adsorbent bed that is operable to remove at least a portion of the hydrogen sulfide present in the hydrocarbon feed to produce a substantially sulfur-free hydrocarbon feed. Adsorber 126 can include any commercially available adsorbent suitable for the removal of hydrogen sulfide, such as zinc oxide, iron oxide, copper-based activated carbon, and other known compounds. Removal of hydrogen sulfide in the hydrocarbon feed is critically important as failure to remove sulfur from the hydrocarbon feed prior to supplying the feed to the solid oxide fuel cell can result in decreased production of electricity as a result of poisoning of the anode of the solid oxide fuel cell.

The substantially sulfur-free hydrocarbon feed can be supplied via line 128 to solid oxide fuel cell 130 for the generation of power. In certain embodiments, the substantially sulfur-free hydrocarbon feed contains less than about 2 ppm total sulfur, alternatively less than about 1 ppm total sulfur, alternatively less than about 0.5 ppm total sulfur, alternatively less than about 0.1 ppm total sulfur. In preferred embodiments, the substantially sulfur-free hydrocarbon feed contains less than about 0.5 ppm total sulfur. In certain embodiments, a pre-reformer can be used to convert the substantially sulfur-free hydrocarbon feed that contains less than about 0.5 ppm total sulfur to a methane-rich gas stream. The solid oxide fuel cell can be any known electrochemical device configured to produce electricity by oxidation of the hydrocarbon feed. The solid oxide fuel cell can include an anode and a cathode, wherein each of the two electrodes can be standard fuel cell electrodes not having any particular improved resistance to poisoning by sulfur or sulfur containing compounds.

In certain embodiments, during start up operation of apparatus 100, integrated reformer 112 can be supplied with 100% of the sulfur containing hydrocarbon feed until the reformer has produced sufficient hydrogen gas to supply hydrodesulfurization unit 108. Typically, at start up when the integrated reformed is being supplied with 100% of the hydrocarbon feed, the hydrodesulfurization unit is in standby mode; i.e., the hydrodesulfurization unit is not supplied with any of the hydrocarbon feed. Once sufficient amounts of hydrogen gas have been, or are being produced by integrated reformer 112, hydrodesulfurization unit 108 can be started and a portion of the hydrocarbon feed can be supplied to hydrodesulfurization unit 108. In certain embodiments, once sufficient hydrogen gas has been produced by reformer 112, a major portion of the hydrocarbon feed can be supplied via line 106 to hydrodesulfurization unit 108. In certain embodiments, between about 5% and 22.5% by volume, alternatively between about 9% and 17% by volume, or alternatively between about 10.4% and 14.85 by volume of the sulfur containing liquid hydrocarbon fuel stream is supplied to the non-catalytic reformer. Alternatively, when a gaseous hydrocarbon feed is employed, between about 3% and 9%, alternatively between about 5% and 7.5% of the sulfur containing gaseous hydrocarbon fuel stream is supplied to the non-catalytic reformer.

In certain embodiments, the amount of hydrocarbon feed that is fed to each of hydrodesulfurization unit 108 and reformer 112 is varied based upon the hydrogen gas needs of hydrodesulfurization unit 108. In certain embodiments, hydrogen production is maintained at about 100% of the amount required by the hydrodesulfurization unit. In alternate embodiments, hydrogen production is maintained at an amount between about 100% and 105%, alternatively between about 100% and 110%, of the amount required by the hydrodesulfurization unit. In certain embodiments, an excess of hydrogen gas is desired as the excess can help to prevent carbon formation in the SOFC anode chamber. In addition, it is believed that the excess hydrogen can also assist with the thermal management of the internal reforming SOFC anode, possibly by moderating the sudden cooling that can take place at the entrance of the SOFC anode where the fast steam reforming reaction takes place. Too large of an excess of hydrogen gas, however, is in certain embodiments, desired to be avoided as it can reduce the overall fuel-to-electricity conversion efficiency in the SOFC as the internal reforming capability will not be fully exploited. In certain embodiments, the amount of reformer product gas that is provided in excess of the hydrodesulfurization unit requirements is maintained at a minimum. In certain embodiments, the means for diverting hydrocarbon feed to reformer 112 can be controlled by a control valve, wherein the control valve receives a signal from hydrodesulfurization unit 108, said signal relating to the amount of hydrogen needed by the hydrodesulfurization unit and controlling the flow of hydrocarbon feed to both the hydrodesulfurization unit and the reformer.

In general, an internal reforming SOFC is one that directly accepts a liquid hydrocarbon feed, which then undergoes the steam reforming reaction on the surface of the anode. In this arrangement, intimate chemical and thermal integration is achieved within the anode chamber of the SOFC. Syngas, consisting of $H_2$ and CO, is produced on the anode surface through steam reforming, and is immediately consumed by the electrochemical oxidation reactions to produce electricity. As syngas and other by-product gases are continually withdrawn from the reaction zone through the electrochemical oxidation reactions to produce electricity, total conversion of liquid hydrocarbon feed is possible at a lower operating temperature, for example less than about 650° C. at 1 bar. Steam reforming of a liquid hydrocarbon feed is highly endothermic, while electrochemical oxidation reactions of the syngas are highly exothermic. As these reactions occur at almost the same location within the anode chamber of the SOFC with complementary heat demand and supply, significant direct thermal integration can be achieved. The combination of direct and intimate chemical and thermal integration yields improved overall fuel-to-electricity conversion efficiency for direct supply of a liquid hydrocarbon feed to an SOFC, as compared to use of syngas as the feed, wherein an external steam reformer is required to convert the liquid hydrocarbon feed into syngas. In certain embodiments, the arrangement can produce an improvement of at least about 10% in the overall fuel-to-electricity conversion efficiency, alternatively at least about 15%, or alternatively at least about 20%. In addition, as the steam reformer is eliminated, design of the present system is simplified. In certain embodiments wherein liquid hydrocarbon feed is supplied directly to the SOFC, the reduction and/or prevention of carbon formation resulting of thermal cracking of the aromatic compounds typically present in high molecular weight hydrocarbons such as gasoline, kerosene, jet fuel and diesel is a key challenge. In certain embodiments, to overcome this challenge, a pre-reformer that includes a catalyst bed containing highly active metals such as nickel, platinum, palladium, rhodium and ruthenium doped with carbon resistant rare earth elements such as scandium, yttrium, cerium, and samarium can be installed upstream of the SOFC to convert the liquid hydrocarbon feed to a methane rich gas stream.

In certain embodiments, the apparatus and process described herein can be used in a vehicle, such as an automobile, airplane, or boat. The small size and high electrical output of the solid oxide fuel cell make the apparatus and methods described herein, particularly the integrated reformer, are ideal for use in a vehicle.

The integrated reformer advantageously provides a dynamically responsive device suitable for responding to the variable hydrogen demands of the hydrodesulfurization unit. Use of a non-catalytic reforming process is preferred as the lack of catalyst reduces negative affects caused by the presence of sulfur in the hydrocarbon feed, for example poisoning of the catalyst, as the presence of sulfur frequently leads to poisoning of the reformer catalyst. Similarly, performance of non-catalytic reforming processes is not affected by the formation of coke, as coke is carried downstream with the product gases and does not build up on the catalyst, thereby degrading the catalyst.

The variable hydrogen production is helpful for instances wherein maximum electrical output from the solid oxide fuel cell is desired. As hydrocarbon feed to the solid oxide fuel cell is increased in response to the need for greater electrical production, the hydrocarbon feed that is supplied to the reformer is increased in a proportional amount.

The present reformer, particularly as described in PCT application WO/2006/103369 and U.S. Pub. Pat. App. No. 2009/0220390 provides several unique advantages, including the fact that because there is no thermal mass in the reaction zone, the reformer can be started and/or shut down quickly. In general, most catalytic reformers have very slow dynamic capabilities due to the thermal mass.

In certain embodiments, a denitrogenation process can be combined with the desulfurization process described herein.

EXAMPLES

In one example, a 35 kW non-catalytic reformer was employed using diesel and heavy naphtha as the hydrocarbon fuel sources. Sulfur content of the diesel fuel was about 570 ppmw. Sulfur content for the naphtha was about 77 ppmw. Multiple trials were performed, as noted below in Table 1, with varying reaction conditions. Oxygen injection (O/C) and steam injection (S/C) are given as a molar ratio of oxygen to carbon and steam to carbon, respectively. Pressure is given in bar, and Residence Time is the average time the hydrocarbon fuel spends in the reformer in seconds. The residence time is also known to be the inverse of the space velocity. $T_{eq}$ is the temperature at equilibrium. The predicted (Eq) temperature, and the observed temperature (Obs), measured in degree Celsius, are provided in Table 1. Predicted (Eq) and observed (Obs.) hydrogen and carbon monoxide content, on a dry and nitrogen-free basis, is expressed as a volume fraction in percentage points. Fuel conversion is measured by determining the amount of hydrocarbon remaining in the product gas stream after the trial reached equilibrium where key operating parameters such as temperatures, pressure, product gas compositions were stable. Thermal efficiency is measured by the sum of Higher Heating Values of hydrogen and carbon monoxide in the reformer product gas divided by the Higher Heating Value of feedstock.

The results shown in Table 1 are for trials conducted with the non-catalytic reformer utilizing diesel fuel as the feedstock. An SOFC was not employed in this example. The theoretical thermodynamically predicted $T_{eq}$ and $H_2$+CO molar fractions at the prevailing operational conditions are listed for comparison relative to actual observations. Hydrocarbon fuel conversion and efficiency were calculated as defined above. The observed $T_{eq}$ was measured with a thermocouple positioned at the exit of the reformer. The $H_2$ and CO compositions were measured with an inline Gas Chromatography-Mass Spectrometry (GC-MS) instrument. Pressure in the reactor was maintained with a back pressure regulator. Suitable flow rates of oxygen and steam corresponding to the desired O/C and S/C ratios were achieved with mass flow controllers. As shown in Table 1, Trial 7 provided the best fuel conversion and thermal efficiency of all the experimental trials. These values were also maintained for a reasonable period of time (more than 20 hours continuously). Fuel conversion and thermal efficiency for Trial 6 were not significantly lower than those observed for Trial 7. For Trial 6, however, a reduction of oxygen and steam usages of nearly 7% and 18.5% was achieved, respectively. Results shown in Table 1 were obtained from a modified version of a non-catalytic reformer device. Details of the device are documented in WO/2006/103369, "Device provided with a reaction chamber in which pre-heated fluid reagents are introduced for generating a high-temperature reaction".

another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the present invention.

TABLE 1

Diesel Fuel Feedstock.

| Trial | Trial Duration (minutes) | O/C | S/C | Pressure (bar) | Residence Time (seconds) | $T_{eq}$ (° C.) Eq/Obs. | $H_2$ + CO (%) Eq/Obs. | Fuel Conversion (%) | Thermal Efficiency (%) |
|---|---|---|---|---|---|---|---|---|---|
| 1 | 197 | 1.13 | 1.78 | 11.2 | 0.35 | 1302/ 1380 | 81.1/ 78.3 | 97.7 | 71.5 |
| 2 | 176 | 1.13 | 1.54 | 11.2 | 0.38 | 1348/ 1390 | 82.2/ 80.09 | 98.6 | 72.4 |
| 3 | 619 | 1.12 | 1.75 | 11.2 | 0.36 | 1300/ 1330 | 81.5/ 76 | 98.6 | 68 |
| 4 | 73 | 1.15 | 1.06 | 11.6 | 0.45 | 1430/ 1420 | 88.94/ 82.76 | 99.5 | 71 |
| 5 | 477 | 1.09 | 1.88 | 12.6 | 0.47 | 1167/ 1414 | 83059/ 80.61 | 99.5 | 74 |
| 6 | 1215 | 1.16 | 1.62 | 13 | 0.43 | 1497/ 1410 | 82.63/ 80.82 | 99.1 | 73.8 |
| 7 | 1215 | 1.24 | 1.92 | 14.8 | 0.45 | 1422/ 1380 | 83.48/ 80.66 | 99.3 | 74.7 |
| 8 | 2486 | 1.27 | 2.1 | 16.5 | 0.47 | 1422/ 1405 | 83.3/ 74.46 | 98.5 | 73.4 |
| 9 | 2486 | 1.29 | 1.82 | 17.5 | 0.53 | 1522/ 1410 | 83.51/ 75.34 | 100 | 64 |
| 10 | 175 | 1.29 | 1.82 | 15.5 | 0.51 | 1430/ 1330 | 82.81/ 68.55 | 99.8 | 60 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that That which is claimed is:

1. A method for producing electricity from a sulfur containing hydrocarbon fuel stream, the method comprising the steps of:
supplying at least a diverted portion of the sulfur containing hydrocarbon fuel stream to a non-catalytic reformer to generate a hydrogen containing product stream;
supplying the hydrogen containing product stream from the reformer and at least a portion of the hydrocarbon fuel stream to a hydrodesulfurization unit, where the diverted portion of the sulfur containing hydrocarbon fuel stream supplied to the non-catalytic reformer is controlled by a control valve, wherein the control valve is configured to receive a signal from the hydrodesulfurization unit, said signal relating to an amount of hydrogen needed by the hydrodesulfurization unit, and wherein the control valve is configured to adjust flow rate of the diverted portion in accordance with said signal;

desulfurizing the sulfur containing hydrocarbon fuel stream in the hydrodesulfurization unit to produce a hydrogen sulfide containing hydrocarbon fuel stream;

supplying the hydrogen sulfide containing hydrocarbon fuel stream from the hydrodesulfurization unit to an adsorber, wherein said adsorber is operable to remove hydrogen sulfide from the hydrocarbon fuel stream to produce a desulfurized hydrocarbon fuel stream; and supplying the desulfurized hydrocarbon fuel stream to a solid oxide fuel cell, wherein said solid oxide fuel cell is configured to produce electricity from said desulfurized hydrocarbon fuel stream.

2. The method of claim 1, further comprising supplying water and oxygen to the non-catalytic reformer, wherein a reaction of the sulfur containing hydrocarbon fuel stream, water and oxygen is operable to produce the product stream comprising hydrogen.

3. The method of claim 1, wherein the product stream comprises between about 50% and 53.6% hydrogen gas by volume.

4. The method of claim 1, wherein the adsorber comprises an adsorbent bed comprising zinc oxide.

5. The method of claim 1, wherein the desulfurized hydrocarbon fuel stream comprises less than about 1 ppm sulfur.

6. The method of claim 1, wherein the desulfurized hydrocarbon fuel stream comprises less than about 0.5 ppm sulfur.

7. The method of claim 1, wherein during continuous operation, between about 5% and about 22% of the sulfur containing hydrocarbon fuel stream by volume is supplied to the reformer.

8. The method of claim 1, wherein during continuous operation, between about 10.4% and about 14.8% of the sulfur containing hydrocarbon fuel stream by volume is supplied to the reformer.

9. The method of claim 1, wherein the ratio of hydrogen to sulfur containing hydrocarbon fuel stream supplied to the hydrodesulfurization unit is between about 100:1 and 500:1.

10. The method of claim 1, wherein upon start up, all of the hydrocarbon fuel stream is supplied to the reformer for the production of the hydrogen containing product stream.

11. The method of claim 1, wherein the sulfur containing hydrocarbon fuel stream comprises hydrocarbons selected from the group consisting of: natural gas; liquefied petroleum gas; naphtha; kerosene; jet fuel; diesel; fuel oil; and mixtures thereof.

12. The method of claim 1, wherein the sulfur containing hydrocarbon fuel stream comprises hydrocarbons having a boiling point in the range of between about 30° C. and about 360° C.

13. The method of claim 1, wherein the sulfur containing hydrocarbon fuel stream comprises hydrocarbons having between about 1 and 25 carbon atoms per molecule.

14. The method of claim 1, wherein the sulfur containing hydrocarbon fuel stream comprises hydrocarbons having between about 1 and 8 carbon atoms per molecule.

15. The method of claim 1, wherein the sulfur containing hydrocarbon fuel stream comprises hydrocarbons having between about 6 and 12 carbon atoms per molecule.

16. The method of claim 1, wherein the sulfur containing hydrocarbon fuel stream comprises hydrocarbons having between about 6 and 16 carbon atoms per molecule.

17. The method of claim 1, wherein the sulfur containing hydrocarbon fuel stream comprises hydrocarbons having between about 8 and 15 carbon atoms per molecule.

18. The method of claim 1, wherein the sulfur containing hydrocarbon fuel stream comprises hydrocarbons having between about 15 and 25 carbon atoms per molecule.

\* \* \* \* \*